United States Patent
Omran et al.

(10) Patent No.: US 12,350,656 B1
(45) Date of Patent: Jul. 8, 2025

(54) METHOD OF MANUFACTURING A NANOCOMPOSITE

(71) Applicant: IMAM MOHAMMAD IBN SAUD ISLAMIC UNIVERSITY, Riyadh (SA)

(72) Inventors: Mohamed Khairy Abdel Fattah Omran, Riyadh (SA); Babiker Yagoub Elhadi Abdulkhair, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/067,168

(22) Filed: Feb. 28, 2025

(51) Int. Cl.
*B01J 27/24* (2006.01)
*B01J 23/00* (2006.01)
(Continued)

(52) U.S. Cl.
CPC .............. *B01J 27/24* (2013.01); *B01J 23/005* (2013.01); *B01J 23/02* (2013.01); *B01J 23/22* (2013.01);
(Continued)

(58) Field of Classification Search
CPC . B01J 27/24; B01J 35/45; B01J 35/643; B01J 35/647; B01J 35/613; B01J 35/633;
(Continued)

(56) References Cited

U.S. PATENT DOCUMENTS 12,281,024 B1 * 4/2025 Abdulkhair ............ C01G 3/006
12,286,349 B1 * 4/2025 Abdulkhair .......... B01J 37/0036

FOREIGN PATENT DOCUMENTS

CN  104140692 B     1/2016
CN  108927193 A  * 12/2018 .............. B01J 27/24
(Continued)

OTHER PUBLICATIONS

Tehreem Zahra et al., "Fabrication of V2O5@g-C3N4 nanocomposite by hydrothermal route for use as an improved electrochemical property in supercapacitor applications." Journal of Energy Storage 87, pp. 1-11. (Year: 2024).*
(Continued)

*Primary Examiner* — Patricia L. Hailey
(74) *Attorney, Agent, or Firm* — Oblon, McClelland, Maier & Neustadt, L.L.P.

(57) ABSTRACT

A method of manufacturing a nanocomposite is described. The method may include combining a magnesium salt, an aluminum salt, and a metavanadate salt in stoichiometric proportions within 5 mol. % in an aqueous solvent including menthol or dextrose, to obtain a first mixture, heating the first mixture to remove at least 99.5 wt. % of the aqueous solvent to obtain a first solid, grinding the first solid into a first powder, calcining the first powder at a temperature of about 600° C. to 800° C. for a time of about 2 to 4 hours to obtain a second solid, grinding the second solid and urea, to form the nanocomposite, into a second powder, heating the second powder at a temperature of about 550° C. to 650° C. for a time of about 15 to 90 minutes to obtain the nanocomposite, including graphitic $C_3N_4$, $V_2O_5$, and $MgAl_2O_4$.

20 Claims, 7 Drawing Sheets

(51) Int. Cl.
  *B01J 23/02* (2006.01)
  *B01J 23/22* (2006.01)
  *B01J 35/45* (2024.01)
  *B01J 35/61* (2024.01)
  *B01J 35/63* (2024.01)
  *B01J 35/64* (2024.01)
  *B01J 37/00* (2006.01)
  *B01J 37/04* (2006.01)
  *B01J 37/08* (2006.01)
  *H01G 11/26* (2013.01)
  *H01G 11/36* (2013.01)

(52) U.S. Cl.
  CPC ........... *B01J 35/45* (2024.01); *B01J 35/613* (2024.01); *B01J 35/633* (2024.01); *B01J 35/635* (2024.01); *B01J 35/643* (2024.01); *B01J 35/647* (2024.01); *B01J 37/0036* (2013.01); *B01J 37/04* (2013.01); *B01J 37/084* (2013.01); *B01J 37/088* (2013.01); *H01G 11/26* (2013.01); *H01G 11/36* (2013.01)

(58) Field of Classification Search
  CPC ........ B01J 35/635; B01J 23/005; B01J 23/02; B01J 23/22; B01J 37/0036; B01J 37/04; B01J 37/084; B01J 37/088; H01G 11/26; H01G 11/36; C01P 2002/32; C01P 2002/76; C01P 2002/78; C01P 2002/72
  USPC .................. 502/174, 200, 524, 340, 353
  See application file for complete search history.

(56) References Cited

FOREIGN PATENT DOCUMENTS

| CN | 113617377 A | * | 11/2021 | ............ B01J 23/22 |
| CN | 115430415 A | * | 12/2022 | ............ B01J 23/34 |
| CN | 116698937 A | * | 9/2023 | ............ G01N 27/30 |
| CN | 117491447 A | * | 2/2024 | ............ G01N 27/308 |
| IN | 425675 | | 3/2023 | |

OTHER PUBLICATIONS

Sachin Shoran et al., "Unleashing the visible light-exposed photocatalytic potential of V2O5/g-C3N4 nanocomposites for dye industries wastewater cleaner production." Chemosphere 345, pp. 1-17. (Year: 2023).*

Worachita Wongtawee et al., "Photocatalytic activity under visible light illumination of organic dyes over g-C3N4/MgAl2O4 nanocomposite." Journal of the Indian Chemical Society 99, pp. 1-12. (Year: 2022).*

Shifa Wang et al., "Construction of g-C3N4/Au/MgAl2O4 photocatalysts with different coupling methods to improve the photodegradation behavior and performance prediction." Journal of Environmental Chemical Engineering 11, pp. 1-16. (Year: 2023).*

April N. Oliveros, et al., "Visible-light photocatalytic diclofenac removal by tunable vanadium pentoxide/boron-doped graphitic carbon nitride composite", Chemical Engineering Journal, vol. 403, 2021(12 pages).

Sakineh Parvarinezhad, et al., "Solid state synthesis of MgAl2 O4 nanomaterials and solar light-induced photocatalytic removal of Malachite green", International Journal of Nano Dimension. Int. J. Nano Dimens., 2019, 10 (1), 89-104 (16 pages).

Milad Zehtab Salmasi, et al., "Spinel MgAl2O4 nanospheres coupled with modified graphitic carbon nitride nanosheets as an efficient Z-scheme photocatalyst for photodegradation of organic contaminants", Applied Surface Science, vol. 585, 2022, (16 pages).

Tsa-Wei Chen, et al., "A sensitive electrochemical determination of chemotherapy agent using graphitic carbon nitride coversd vanadium oxide nanocomposite; sonochemical approach", Ultrasonics Sonochemistry, vol. 58, 2019 (8 pages).

* cited by examiner

METHOD OF MANUFACTURING A NANOCOMPOSITE

BACKGROUND

Technical Field

The present disclosure is directed towards nanocomposite synthesis techniques, and more particularly, towards a method of manufacturing a nanocomposite including graphitic $C_3N_4$, $V_2O_5$, and $MgAl_2O_4$.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Energy storage devices, such as supercapacitors, require materials with high specific surface area, excellent electrical conductivity, and chemical stability to achieve desirable performance. Carbon nanomaterials have emerged as a promising class of materials for such applications due to their properties and versatility. Carbon nanomaterials possess a highly specific surface area, which facilitates increased contact with electrolytes, thereby enhancing the active area essential for efficient charge storage and discharge processes. Furthermore, carbon nanomaterials exhibit excellent electrical conductivity, which is crucial for improving charge transfer efficiency and overall device performance.

In addition to the inherent properties, carbon nanomaterials are chemically stable and can be easily loaded with electrochemically active species to further enhance energy storage capabilities. The cost-effectiveness and environmentally friendly nature of carbon nanomaterials render them a preferred choice for various energy storage applications. Moreover, the integration of carbon nanomaterials into composite structures or combination with other materials, such as metal films or graphene, has been shown to significantly improve the energy density and rate performance of supercapacitors.

Among carbon-based materials, graphitic carbon nitride (g-$C_3N_4$) presents several advantages over traditional activated carbon for supercapacitor applications. g-$C_3N_4$ is an active photocatalyst under visible light, in contrast to activated carbon, which lacks photocatalytic activity. The aforementioned property permits g-$C_3N_4$ to harness solar energy for charge storage, providing a renewable and sustainable energy solution. Additionally, g-$C_3N_4$ has a narrower bandgap compared to activated carbon, permitting g-$C_3N_4$ to absorb a broader spectrum of light wavelengths. The aforementioned characteristic enhances energy conversion efficiency and contributes to improved supercapacitor performance. Furthermore, g-$C_3N_4$ can be readily modified and tailored through techniques such as carbon-defect engineering and two-dimensional structural engineering. The modifications may enhance the structural properties of g-$C_3N_4$, such as increasing surface area and porosity, which are critical factors for effective charge storage in supercapacitors. As a result, g-$C_3N_4$ exhibits superior photoactivity, broader light absorption capabilities, and improved structural properties compared to activated carbon.

Further research has been conducted, e.g., in *Surfaces* 2024, 7 (3), 493-507 and *Molecules* 2024, 29 (9), 2082, each of which is incorporated by reference herein. Despite these advancements, current methods for synthesizing g-$C_3N_4$-based materials face several limitations. Traditional synthesis methods may result in agglomeration, limited surface area, and poor dispersion of active materials, thereby restricting the overall performance of the supercapacitor. Moreover, the scalability and cost-effectiveness of these methods remain a challenge for large-scale commercial applications. The stability and durability of the synthesized materials are to be further improved to ensure long-term operational efficiency in practical applications. Hence, a requirement arises for a better and more efficient method of producing nanomaterials.

Accordingly, one object of the present disclosure is to provide a method of manufacturing a nanocomposite, that may circumvent the above listed drawbacks and limitations of the methods known in the art.

SUMMARY

In an exemplary embodiment, a method of manufacturing a nanocomposite is described. The method may include combining a magnesium salt, an aluminum salt, and a metavanadate salt in stoichiometric proportions within 5 mol. % in an aqueous solvent including menthol or dextrose, to obtain a first mixture. The method further may include heating the first mixture to remove at least 99.5 wt. % of the aqueous solvent to obtain a first solid, grinding the first solid into a first powder, calcining the first powder at a temperature in a range of from 600° C. to 800° C. for a time in a range of 2 to 4 hours to obtain a second solid, grinding the second solid and urea, in an amount sufficient to form the nanocomposite, into a second powder, heating the second powder at a temperature in a range of from 550° C. to 650° C. for a time in a range of 15 minutes to 1.5 hours to obtain the nanocomposite, including graphitic $C_3N_4$, $V_2O_5$, and $MgAl_2O_4$ in a mass relationship to each other in a range of 5 to 15:2 to 7:75 to 95.

The average pore distribution of the nanocomposite is unimodal, a Brunauer-Emmett-Teller (BET) specific surface area of the nanocomposite may be in a range of 25 m$^2$/g to 75 m$^2$/g (43.3 m$^2$/g), and/or an average pore diameter of the nanocomposite, according to Barrett-Joyner-Halenda (BJH) measurement method, may be in a range of 1 nanometer (nm) to 10 nm (5.66 nm), and/or an average pore volume of the nanocomposite, according to the BJH measurement method, is in a range of from 0.01 cm$^3$/g to 0.5 cm$^3$/g (0.105 cm$^3$/g).

The nanocomposite may have a (111) interplanar spacing in a range of from 0.220 to 0.300 nm, a (400) spinel interplanar spacing in a range of from 0.140 to 0.220 nm, a (220) interplanar spacing in a range of from 0.105 to 0.195 nm, and/or a (620) spinel interplanar spacing in a range of from 0.090 to 0.170, according to selected area diffraction (SAED).

The mass relationship of the nanocomposite may be in a range of from 9 to 11:4 to 6:84 to 86. The nanocomposite may have a (111) spinel interplanar spacing of 0.260±2% nm, a (400) spinel interplanar spacing of 0.183±2% nm, a (220) interplanar spacing of 0.147±2% nm, and/or a (620) spinel interplanar spacing of 0.129±2% nm, according to selected area diffraction. Further, an X-ray diffraction (XRD) spectrum of the nanocomposite under Cu-filtered Cu-Kα radiation (1.5418 Å) powered at 45 kV and 10 mA has 2θ peaks of an $MgAl_2O_4$ spinel phase at 18.6±1°, 44.9±1°, 56.1±1°, 59.7±1°, and/or 74.7±1°, an MgO cubic phase at 37.0±1°, 62.6±1°, 75.7±1°, and/or 79.07±1°, an $Al_2O_3V_2O_5$ phase at 26.6±1°, 34.0±1°, 43.1±1°, and/or 64.9±1°, and/or g-$C_3N_4$-related diffractions at 67.2±1° and/or 79.0±1°. The $V_2O_5$ may be at least 95% dissolved within the $MgAl_2O_4$ spinel phase and g-$C_3N_4$ lattice, as detected in the XRD spectrum.

The magnesium salt in the combining may include $Mg(NO_3)_2$, the aluminum salt in the combining may include $Al(NO_3)_3$, the metavanadate salt in the combining may include $NH_4VO_3$, the heating of the first mixture obtains the first solid with at least 99.9 wt. % of the aqueous solvent removed, the calcining is at a temperature in a range of from 675° C. to 725° C. for a time in a range of 2.75 to 3.25 hours, and the heating of the second powder is at a temperature in a range of from 590° C. to 610° C. for a time in a range of from 55 minutes to 1.1 hours.

The nanocomposite may include no more than 10 wt. % of $TiO_2$, relative to a total metal oxide weight.

The nanocomposite may include no more than 1 wt. % of AlN, relative to a total metal oxide weight.

The nanocomposite may include no more than 1 wt. % $SiO_2$, relative to a total metal oxide weight.

Relative to total carbon material weight and/or relative to total nanocomposite weight, carbon materials in the nanocomposite may include no more than 1 wt. % carbon nanotubes.

The nanocomposite may include no more than 1 wt. % AgBr, relative to a total metal oxide weight.

The nanocomposite may include no more than 1 wt. % Co, relative to total nanocomposite weight.

The nanocomposite may include no more than 1 wt. % elemental state metal, relative to total nanocomposite weight.

The nanocomposite may include no more than 1 wt. %, individually, elemental state Co and/or Fe, relative to total nanocomposite weight.

Inventive methods may avoid or not include sonicating any starting materials, particularly in a range of from 1 kilohertz (kHz) to 100 kHz.

The nanocomposite may include no more than 10 wt. % MgO, relative to a total metal oxide weight.

The nanocomposite obtained may include no more than 1 wt. % carbonaceous material besides the graphitic carbon nitride, and carbon materials in the nanocomposite include no nanotubes, relative to total nanocomposite weight.

The nanocomposite may include no more than 10 wt. % $VO_4$, relative to total vanadium-oxide weight, and the nanocomposite may include no more than 1 wt. % V-doped ZnO, relative to total nanocomposite weight.

Relative to a total metal oxide weight, the nanocomposite may include no more than 1 wt. %, individually or in any combination, of $Al_2O_3$, ZnO, $Fe_3O_4$, $CeFeO_3$, $GdFeO_3$, $LaFeO_3$, $BaTiO_3$, $CaTiO_3$, $SrTiO_3$, $CaZrO_3$, $PbTiO_3$, $Mg_{1-x}Ni_xFe_2O_4$ (x=0.0, 0.6, 1.0), Ag, $CoFe_2O_4$, $CuFe_2O_4$, $MnFe_2O_4$, $NiFe_2O_4$, $ZnFe_2O_4$, $Cu_{1-x}Cd_xFe_2O_4$, $Zn_{0.7}Ni_{0.15}Cu_{0.15}Fe_2O_4$, $Zn_{0.3}Ni_{0.7-x}Co_xFe_2O_4$ (0≤x≤0.7), $Mn_{0.1}Mg_{0.2}$ (Co, Ni, Zn)$_{0.7}Fe_2O_4$, $LaCo_{0.5}Fe_{0.5}O_3$, $Mg_{0.1}$—$Co_{0.9}Fe_2O_4$, $La_{1-x}Gd_xCr_{1-y}Ni_yO_3$, $Gd_2FeCrO_6$, $KTaO_3$, $NaTaO_3$, $NaNbO_3$, $KNbO_3$, $Mg_{1-x}Ni_xFe_2O_4$, $Cu_{0.5}Cd_{0.25}Co_{0.25}Fe_{2-x}O_4$, $Zn_{0.5}CO_{0.5}La_xFe_{2-x}O_4$, $Pr_2Ti_2O_7$, $SiO_2$, $TiO_2$, ZnO, ZnS, $Bi_4O_5I_2$, $SrFe_{0.5}Ta_{0.5}O_3$, $La_{0.8}Ba_{0.2}TiO_{3.5-\delta}$, $LaTiO_{3.5-\delta}$, $NaNbO_3$, and $LaFeO_3$.

The graphitic $C_3N_4$ in the nanocomposite may consist essentially of sheet morphologies, i.e., such that no more than 5% in the interlayer spacing is incurred relative to nanocomposites with pure sheet morphologies. The graphitic $C_3N_4$ in the nanocomposite may include no more than inevitable traces of boron or may have no added boron.

The nanocomposite comprises no more than 10 wt. %, individually or in any combination, relative to total metal content, of any of Zn, Ce, Gd, La, Ba, Ti, Ca, Sr, Zr, Pb, Ni, Ag, Co, Cu, Mn, Cd, Ta, Nb, Pr, and Bi. The nanocomposite comprises no more than 1 wt. %, individually or in any combination, relative to total carrier weight, of $SiO_2$, $TiO_2$, ZnO, and ZnS.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

When describing the present disclosure, the terms used are to be construed in accordance with the following definitions, unless a context dictates otherwise.

Embodiments of the present invention will now be described more fully hereinafter with reference to the accompanying drawings wherever applicable, in that some, but not all, embodiments of the disclosure are shown.

In the drawings, like reference numerals designate identical or corresponding parts throughout the several views. Further, as used herein, the words 'a,' 'an' and the like generally carry a meaning of 'one or more,' unless stated otherwise.

Furthermore, the terms 'approximately,' 'approximate,' 'about,' and similar terms generally refer to ranges that include the identified value within a margin of 20%, 10%, or preferably 5%, and any values therebetween.

As used herein, the term 'room temperature' refers to a temperature range of '25 degrees Celsius (° C.)±3° C. in the present disclosure.

As used herein, the term 'nanoparticles (NPs)' refers to particles having a particle size of 1 nanometer (nm) to 500 nm within the scope of the present invention.

As used herein, the term 'nanocomposite' refers to a composite material that has at least one component with a grain size measured in nanometers.

As used herein, the term 'nanohybrid composite' refers to a material that combines nanomaterials (such as nanoparticles, nanotubes, or nanofibers) with another material, typically a polymer, metal, or ceramic, to form a composite structure. The nanomaterials are typically incorporated at the nanoscale level to enhance the properties of the base material, such as improving strength, conductivity, or flexibility, while maintaining the advantages of both components. The resulting nanohybrid composite exhibits unique properties that are superior to the individual materials alone.

As used herein, the term 'porosity' refers to a measure of the void or vacant spaces within a material.

As used herein, the term 'pore diameter' refers to an average width or size of the pores (void spaces) within a material, typically measured in nm or angstroms (Å). It is a key parameter in characterizing the texture and permeability of porous materials, influencing their adsorption, filtration, or catalytic properties. The pore diameter is often determined using methods such as nitrogen adsorption or mercury intrusion, which provide insights into the material's ability to absorb or interact with molecules of specific sizes.

As used herein, the term 'pore volume' refers to the total volume of void spaces (pores) within a material that is capable of being filled by a gas or liquid. It is typically expressed in cubic centimeters per gram ($cm^3/g$) and is an important parameter in characterizing the porous structure of materials, such as adsorbents or catalysts.

As used herein, the term 'unimodal' refers to a distribution or pattern that has a single peak or mode. In the context of particle size or material properties, it indicates that the sample consists of particles or components that are primarily of one size or characteristic, rather than varying widely in size or composition.

As used herein, the term 'ultrasonication' refers to a process that uses high-frequency sound waves to agitate particles in a liquid, creating pressure changes that generate microscopic bubbles. When these bubbles collapse, they produce shear forces that help break apart particles, disperse substances, or enhance chemical reactions.

As used herein, the term 'spinel interplanar spacing' refers to the distance between parallel planes of atoms in the crystal structure of a spinel material. Spinel is a type of mineral with a specific crystalline arrangement, represented by the general formula $AB_2O_4$, where 'A' and 'B' are metal ions. The interplanar spacing is crucial for understanding the material's structural properties and is typically measured using X-ray diffraction (XRD) techniques.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, and isotopes of carbon include $^{13}C$ and $^{14}C$. Isotopes of oxygen include $^{16}O$, $^{17}O$, and $^{18}O$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

Aspect of the present disclosure is directed to a method of forming a nanocomposite of graphitic carbon nitride ($g-C_3N_4$), vanadium oxide ($V_2O_5$), and magnesium aluminate ($MgAl_2O_4$) ($C_3N_4@ V_2O_5/MgAl_2O_4$). Each component of the nanocomposite, when used in appropriate ratios, is effective in the photodegradation of organic contaminants in water with high efficiency and photodegradation activity.

A nanocomposite ($g-C_3N_4@ V_2O_5/MgAl_2O_4$) including $g-C_3N_4$, $V_2O_5$ and $MgAl_2O_4$ is described. The nanocomposite may include coating of $g-C_3N_4$ on $V_2O_5$ and $MgAl_2O_4$. The $g-C_3N_4$, $V_2O_5$, and $MgAl_2O_4$ are present in the nanocomposite in a mass relationship to each other in a range of from 5 to 15:2 to 7:75 to 95, preferably 7 to 13:3 to 6:80 to 90, and preferably 9 to 11:4 to 5:84 to 86. The $g-C_3N_4$, $V_2O_5$, and $MgAl_2O_4$ may be present in the nanocomposite in a mass relationship to each other of 10:5:85, while tolerable variations of any of these values may be ±2.5, 2, 1.5, 1, 0.75, 0.5, 0.25, 0.1, 0.5, or 0.1. The nanocomposite exhibits excellent performance in photodegradation of organic pollutants, hydrogen generation, and anticancer activity. The material demonstrates enhanced catalytic properties, high surface reactivity, and efficient adsorption, making it suitable for applications in environmental remediation, energy production, and biomedical treatments.

The nanocomposite may contain $g-C_3N_4$ in an amount ranging from 5 to 15 wt. %, including 5 to 7 wt. %, 7 to 9 wt. %, 9 to 11 wt. %, 11 to 13 wt. %, and 13 to 15 wt. % based on the total weight of the nanocomposite. The nanocomposite may contain 10±2, 1.5, 1, 0.75, 0.5, 0.25, 0.2, or 0.1 wt. % of graphite-phase carbon nitride ($g-C_3N_4$).

The nanocomposite may contain $V_2O_5$ in an amount ranging from 2 to 7 wt. %, including 3 to 7 wt. %, 7 to 11 wt. %, 11 to 13 wt. %, 13 to 15 wt. %, and 15 to 17 wt. % based on the total weight of the nanocomposite. In a preferred embodiment, the nanocomposite may contain 5±1, 0.75, 0.5, 0.25, 0.2, or 0.1 wt. % of $MoO_3$.

The nanocomposite may contain magnesium aluminum oxide ($MgAl_2O_4$) in an amount ranging from 75 to 95 wt. %, including 80 to 82 wt. %, 82 to 84 wt. %, 84 to 86 wt. %, 86 to 88 wt. %, and 88 to 90 wt. % based on the total weight of the nanocomposite. In a preferred embodiment, the nanocomposite may contain 85±5, 4, 3, 2.5, 2, 1.5, 1, 0.75, 0.5, 0.25, 0.2, or 0.1 wt. % of magnesium aluminum oxide ($MgAl_2O_4$).

The nanocomposite may be porous. A porous material is the one that forms a porous bulk solid. Pores may be micropores, mesopores, macropores, and/or a combination thereof. The pores exist in the bulk material, not necessarily in the molecular structure of the material. The term 'microporous' means that nanocomposite have pores with an average pore width (i.e. diameter) of less than 2 nm, e.g., in a range with an upper limit of 2, 1, 0.9, 0.75, 0.5, 0.25, 0.1, 0.05, or 0.01 nm, and/or a lower limit of 0.00001, 0.0001, 0.001, 0.01, 0.1, 0.25, 0.5, 0.75, or 1 nm. The term 'mesoporous' means the pores of the nanocomposite have an average pore width of 2 to 50 nm, though this may include subranges within this general range, e.g., a minimum diameter of 2, 3, 5, 10, 15, 20, 25, or 35 m, and/or a maximum diameter of 50, 45, 40, 35, 30, 25, 20, 15, or 10 nm. The term 'macroporous' means the pores of nanocomposite have an average pore width larger than 50 nm, e.g., at least 55, 75, 100, 250, 500, 750, or 1000 nm. Pore size may be determined by methods including, but not limited to, gas adsorption (e.g. $N_2$ adsorption), mercury intrusion porosimetry, and imaging techniques such as scanning electron microscopy (SEM), and X-ray computed tomography (XRCT).

In some embodiments, a Brunauer-Emmett-Teller (BET) specific surface area of the nanocomposite is in a range of from 25 to 75 $m^2/g$, preferably 26 to 70 $m^2/g$, preferably 30 to 65 $m^2/g$, preferably 35 to 60 $m^2/g$, preferably 40 to 50 $m^2/g$. In a preferred embodiment, the surface area of the nanocomposite is 43.3±5, 4, 3, 2.5, 2, 1.5, 1, 0.75, 0.5, 0.25, 0.2, or 0.1 $m^2/g$. The BET hypothesis is the foundation for a significant analysis method for determining the specific surface area of a material. It attempts to explain the physical adsorption of gas molecules on a solid surface. Specific surface area is a property of solids, which is the total surface area of a material per unit of mass, solid or bulk volume, or cross-sectional area. In some embodiments, pore diameter, pore volume, and BET surface area are measured by gas adsorption analysis, preferably $N_2$ adsorption analysis (e.g., $N_2$ adsorption isotherms).

The average pore distribution of the nanocomposite may include, but is not limited to, crystalline average pore distribution, bimodal, trimodal, multimodal, narrow, broad, and Gaussian. The average pore distribution of nanocomposite may be unimodal, indicating a single dominant pore size within the material. This unimodal distribution suggests that the nanocomposites possess a relatively narrow pore size range, resulting in more uniform pore structures and enhancing specific properties such as adsorption capacity, catalytic activity, or surface reactivity.

The average pore diameter of the nanocomposite, according to Barrett-Joyner-Halenda (BJH) measurement method, may be in a range of from 1 to 10 nm, preferably 2 to 9 nm, preferably 3 to 8 nm, preferably 5 to 7 nm. In a preferred embodiment, the nanocomposite has an average pore diameter of 5.66±1, 0.75, 0.5, 0.25, 0.2, or 0.1 nm.

The average pore volume of the nanocomposite, according to the BJH measurement method, may be in a range of from 0.01 to 0.5 $cm^3/g$, preferably, 0.02 to 0.4 $cm^3/g$. preferably 0.03 to 0.3 $cm^3/g$, preferably 0.05 to 0.2 $cm^3/g$. The nanocomposite has an average pore volume of 0.105±0.075, 0.05, 0.025, 0.02, or 0.01 $cm^3/g$.

The nanocomposite may have a (111) interplanar spacing in a range of from 0.220 to 0.300 nm, preferably 0.23 to 0.29 nm, preferably 0.24 to 0.28 nm, preferably 0.25 to 0.27 nm, preferably 0.26 nm, according to selected area diffraction. The nanocomposite may have a (400) spinel interplanar spacing in the range of 0.140 to 0.220 nm, preferably 0.15 to 0.21 nm, preferably 0.16 to 0.2 nm, preferably 0.17 to 0.19 nm, preferably 0.18, preferably 0.183 nm, according to selected area diffraction. The nanocomposite may have a (220) interplanar spacing in a range of from 0.105 to 0.195 nm, preferably 0.11 to 0.18 nm, preferably 0.12 to 0.17 nm, preferably 0.13 to 0.16 nm, preferably 0.14 to 0.15 nm, preferably 0.147 nm, according to selected area diffraction. The nanocomposite may have a (620) spinel interplanar spacing in a range of from 0.090 to 0.170, preferably 0.1 to 0.15 nm, preferably 0.1 to 0.13 nm, preferably 0.1 to 0.12 nm, preferably 0.129 nm, according to selected area diffraction.

The nanocomposite may have a (111) interplanar spacing of 0.260+2% nm, a (400) spinel interplanar spacing of 0.183±2% nm, a (220) interplanar spacing of 0.147±2% nm, and/or a (620) spinel interplanar spacing of 0.129±2% nm, according to selected area diffraction.

The mass relationship of the nanocomposite may be in a range of 9 to 11:4 to 6:84 to 86. In a preferred embodiment, the nanocomposite may include 10:5:85, wt. % of the respected components, while tolerable variations of any of these values may be ±5, 4, 3, 2.5, 2, 1.5, 1, 0.75, 0.5, 0.25, 0.1, 0.5, or 0.1.

The XRD spectrum of the nanocomposite may show that the nanocomposite is crystalline and exhibits a magnesium oxide (MgO) phase, a magnesium aluminum oxide ($MgAl_2O_4$) phase, an $Al_2O_3V_2O_5$ phase, and a graphite-related diffractions. In some embodiments, $V_2O_5$ is at least 95% dissolved within the $MgAl_2O_4$ spinel phase and $g-C_3N_4$ lattice.

The MgO may exist in various phases like cubic, hexagonal, and puckered layers. The $Al_2O_3V_2O_5$ may exist in zircon-type (tetragonal) or monazite-type (monoclinic) structures, or may include a combination thereof. The graphitic carbon nitride ($g-C_3N_4$) may exist in several crystalline phases, including α (alpha), β (beta), γ (gamma), and other less-common phases, or mixtures thereof.

The $MgAl_2O_4$ may have a spinel phase. The spinel phase is a mixed oxide with the general formula $AB_2O_4$, including one divalent cation ($A^{2+}$) and two trivalent cations ($B^{3+}$). The unit cell consists of a face-centered cubic arrangement of oxygen ions, containing 32 $O^{2-}$-ions, with 64 tetrahedral and 32 octahedral sites occupied by $A^{2+}$ and $B^{3+}$ cations. When one half of the octahedral interstices are occupied by $B^{3+}$ cations and one-eighth of the tetrahedral sites are occupied by $A^{2+}$ cations, the spinel phase is termed "normal". Conversely, when tetrahedral sites are occupied by half of the $B^{3+}$ and octahedral sites by the other half along with $A^{2+}$, the spinel phase is termed "inverse". The spinel phase with the chemical formula $MgAl_2O_4$ is a mineral type of this oxide family. $MgAl_2O_4$ has been widely used in various applications, such as in metallurgical, electrochemical, radio-technical, and chemical industrial fields owing to its high thermal stability (melting point at 2135° C., high hardness (16 gigapascal (GPa)), high mechanical resistance, high resistance against chemical attack, wide band gap energy, high electrical resistivity, relatively low thermal expansion coefficient ($9.10^{-6}$ 1/° C.) between 30 and 1400° C., low dielectric constant, low density (3.58 gram per cubic centimeters ($g/cm^3$)), high thermal shock resistance, hydrophobicity, and low surface acidity.

The XRD spectrum of the nanocomposite under Cu-filtered CuKa radiation (1.5418 Å) powered at 45 kilovolt (kV) and 10 milliampere (mA) may have 20 peaks of an $MgAl_2O_4$ spinel phase at 18.6±1, 44.9±1, 56.1±1, 59.7±1, and/or 74.7±1°. The XRD spectrum of the nanocomposite under Cu-filtered CuKa radiation (1.5418 Å) powered at 45 kilovolt (kV) and 10 milliampere (mA) may have 20 peaks of an MgO cubic phase at 37.0±1, 62.6±1, 75.7±1, and/or 79.07±1. The XRD spectrum of the nanocomposite under Cu-filtered CuKa radiation (1.5418 Å) powered at 45 kilovolt (kV) and 10 milliampere (mA) may have 20 peaks of an $Al_2O_3V_2O_5$ phase at 26.6±1, 34.0±1, 43.1±1, and/or 64.9±1°. The XRD spectrum of the nanocomposite under Cu-filtered CuKa radiation (1.5418 Å) powered at 45 kilovolt (kV) and 10 milliampere (mA) may have 20 peaks of g-$C_3N_4$-related diffractions at 67.2±1 and/or 79.0±1°.

The nanocomposite may include no more than 10 wt. %, preferably 9 wt. %, preferably 8 wt. %, preferably 7 wt. %, preferably 6 wt. %, preferably 5 wt. %, preferably 4 wt. %, preferably 3 wt. %, preferably 2 wt. %, preferably 1 wt. %, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.09 wt. %, preferably less than 0.06 wt. %, preferably less than 0.04 wt. %, preferably less than 0.01 wt. % $TiO_2$, relative to a total metal oxide weight.

The nanocomposite may include no more than 1 wt. %, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.09 wt. %, preferably less than 0.06 wt. %, preferably less than 0.04 wt. %, preferably less than 0.01 wt. %, AlN relative to the total metal oxide weight.

The nanocomposite may include no more than 1 wt. %, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.09 wt. %, preferably less than 0.06 wt. %, preferably less than 0.04 wt. %, preferably less than 0.01 wt. %, $SiO_2$ relative to the total metal oxide weight.

The nanocomposite may include no more than 1 wt. %, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.09 wt. %, preferably less than 0.06 wt. %, preferably less than 0.04 wt. %, preferably less than 0.01 wt. % AgBr, relative to the total metal oxide weight.

The carbon materials in the nanocomposite may include no more than 1 wt. %, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.05 wt. %, and preferably less than 0.01 wt. % of carbon nanotubes, relative to total carbon material weight.

A low concentration of carbon material (carbon nanotubes) may contribute to maintaining the desired structural integrity and functional properties of the nanocomposite.

The minimal amount of additional carbon material prevents any significant interference with the performance of the nanocomposite, particularly in applications such as energy storage, where the purity and specific properties can be crucial.

The nanocomposite may include no more than 1 wt. %, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.09 wt. %, preferably less than 0.06 wt. %, preferably less than 0.04 wt. %, preferably less than 0.01 wt. %, elemental state Co, relative to total nanocomposite weight.

The nanocomposite may include no more than 1 wt. %, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.09 wt. %, preferably less than 0.06 wt. %, preferably less than 0.04 wt. %, preferably less than 0.01 wt. %, elemental state metal, relative to total nanocomposite weight.

The nanocomposite may include no more than 1 wt. %, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.09 wt. %, preferably less than 0.06 wt. %, preferably less than 0.04 wt. %, preferably less than 0.01 wt. %, individually, elemental state Co and/or Fe, relative to total nanocomposite weight.

The nanocomposite may include no more than 10 wt. %, preferably 9 wt. %, preferably 8 wt. %, preferably 7 wt. %, preferably 6 wt. %, preferably 5 wt. %, preferably 4 wt. %, preferably 3 wt. %, preferably 2 wt. %, preferably 1 wt. %, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.09 wt. %, preferably less than 0.06 wt. %, preferably less than 0.04 wt. %, preferably less than 0.01 wt. %, $VO_4$, relative to total vanadium-oxide weight.

The nanocomposite may include no more than 1 wt. %, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.09 wt. %, preferably less than 0.06 wt. %, preferably less than 0.04 wt. %, preferably less than 0.01 wt. %, V-doped ZnO, relative to total nanocomposite weight.

The nanocomposite obtained may include no more than 1 wt. % of carbonaceous material, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.05 wt. %, and preferably less than 0.01 wt. % of carbonaceous material besides the graphitic carbon nitride.

The morphology of the g-$C_3N_4$ may be nanowires, nanospheres, nanocrystals, nanorectangles, nanotriangles, nanopentagons, nanohexagons, nanoprisms, nanodisks, nanocubes, nanoribbons, nanoblocks, nanotoroids, nanodiscs, nanobarrels, nanogranules, nanowhiskers, nanoflakes, nanofoils, nanopowders, nanoboxes, nanobeads, nanobelts, nanourchins, nanoflowers, nanostars, tetrapods, etc., and mixtures thereof. The g-$C_3N_4$ in the nanocomposite may consist essentially of sheet morphologies, i.e., such that a decrease of no more than 2.5% of the BET surface area is incurred relative to nanocomposites with pure sheet morphologies.

Figure 1:
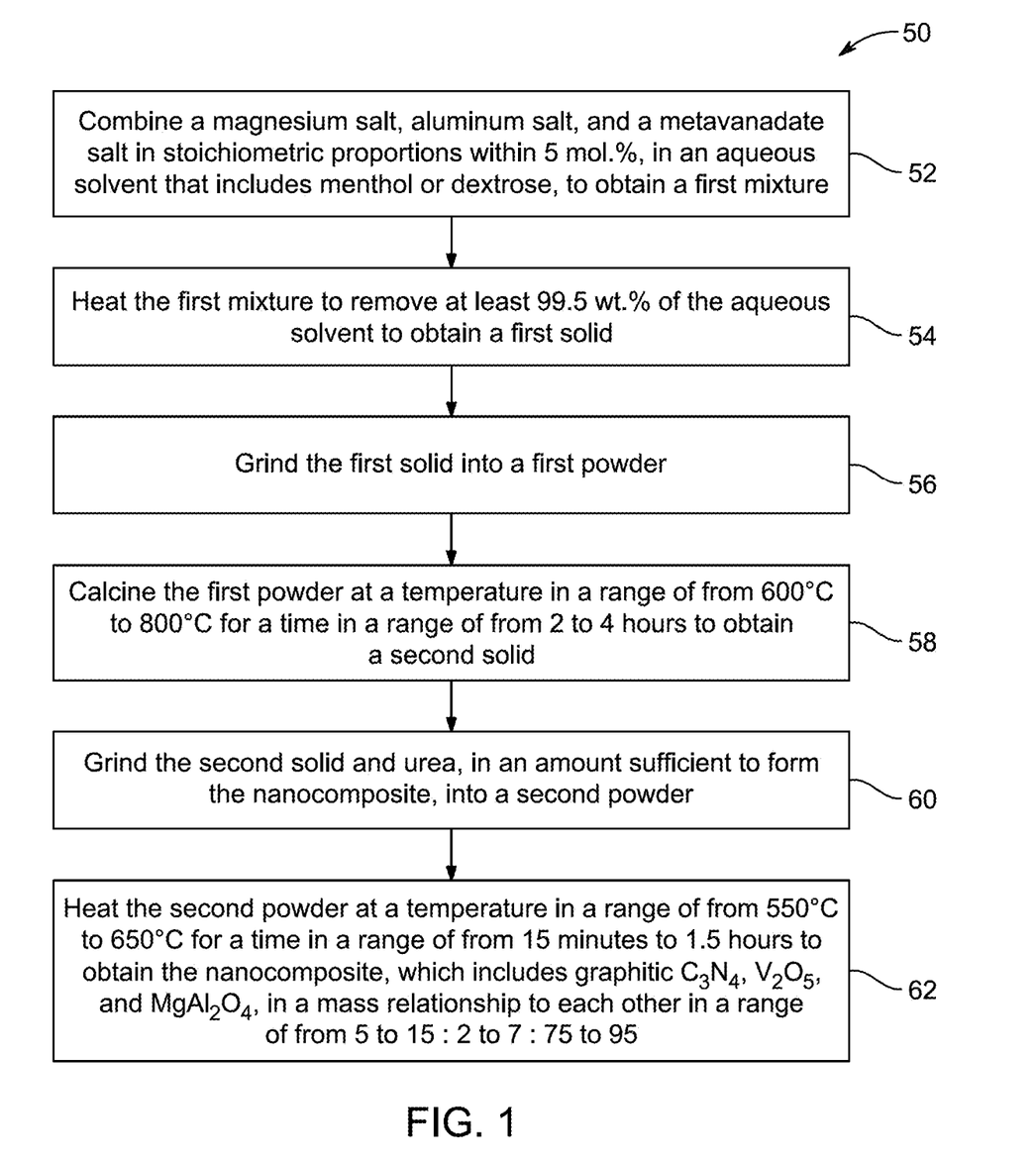
FIG. 1 is an exemplary flow chart depicting a method of manufacturing an inventive nanocomposite including graphitic-$C_3N_4$ and a metavanadate salt.

FIG. 1 illustrates a schematic flow chart of a method 50 of manufacturing the $C_3N_4$@ $V_2O_5$/$MgAl_2O_4$ nanocomposite. The order in which the method 50 is described is not intended to be construed as a limitation, and any number of the described method steps can be combined to implement the method 50. Additionally, individual steps may be removed or skipped from the method 50 without departing from the spirit and scope of the present disclosure.

At step 52, the method 50 may include combining a magnesium salt, aluminum salt, and a metavanadate salt in stoichiometric proportions within 5 mole percent (mol. %) in an aqueous solvent comprising menthol or dextrose, to obtain a first mixture. The magnesium salt in the combining may include, but is not limited to, magnesium chloride, magnesium sulfate, magnesium carbonate, magnesium oxide, magnesium fluoride, magnesium bromide, magnesium iodide, magnesium hydroxide, magnesium citrate, magnesium malate, magnesium lactate, magnesium gluconate, magnesium ascorbate, magnesium tartrate, magnesium perchlorate, magnesium phosphate, magnesium stearate, magnesium pyrophosphate, magnesium silicate, magnesium borate, magnesium nitrate, magnesium formate, magnesium acetate, magnesium hypophosphite, magnesium tungstate, magnesium thiosulfate, magnesium nitride, magnesium aluminate, and magnesium succinate. In a preferred embodiment, the magnesium salt is magnesium nitrate ($Mg(NO_3)_2$).

The aluminum salts in the combining may include, but are not limited to, aluminum nitrate, aluminum chloride, aluminum sulfate, and aluminum acetate. The aluminum salts may include, but are not limited to, aluminum bromide, aluminum nitrate, aluminum fluoride, aluminum iodide, aluminum thiocyanate, aluminum formate, and aluminum lactate. In a preferred embodiment, the aluminum salt is aluminum nitrate ($Al(NO_3)_3$).

The metavanadate salt in the combining may include but not limited to sodium metavanadate, potassium metavanadate, ammonium metavanadate, calcium metavanadate and magnesium metavanadate. In a preferred embodiment, the metavanadate salt is ammonium metavanadate ($NH_4VO_3$).

The method need not and may not include sonicating any starting materials in a range of from 1 to 100 kHz. Other modes of agitation known to those of ordinary skill in the art, for example, via stirring, swirling, or a combination thereof may be employed to form the resultant mixture, though these are optional.

At step 54, the method 50 may include heating the first mixture to remove the aqueous solvent to obtain a first solid. The heating of the first mixture removes the aqueous solvent such that the first solid is a solid that can be ground to a powder without further solvent removal. An aqueous solvent is a solvent in which water serves as the primary medium for dissolving other substances. Water is considered a polar solvent, which enables it to dissolve a wide variety of ionic and polar compounds. Water may be tap water, distilled water, double-distilled water, deionized water, deionized distilled water, reverse osmosis water, and/or some other water. Examples of aqueous solvents include water itself, as well as solutions like sodium chloride solution, acetic acid solution, ethanol solution, hydrochloric acid solution, sodium hydroxide solution, ammonia solution, hydrogen peroxide solution, and sodium bicarbonate solution. Other examples include potassium permanganate solution, citric acid solution, potassium chloride solution, glycerol solution, urea solution, calcium chloride solution, magnesium sulfate solution, sodium acetate solution, formic acid solution, and sodium nitrate solution. In a preferred embodiment, the aqueous solvent is distilled water.

The heating can be performed by using heating appliances such as ovens, microwaves, autoclaves, hot plates, heating mantles and tapes, oil baths, salt baths, sand baths, air baths, hot-tube furnaces, and hot-air guns. In some embodiments, heating the first mixture removed at least 99.5 wt. % of the aqueous solvent to obtain a first solid. The heating of the first mixture obtains the first solid with at least 99.9 wt. % of the aqueous solvent removed.

At step 56, the method 50 may include grinding the first solid into a first powder. The grinding may be carried out using any suitable means, for example, ball milling, blending, using manual method 50 (e.g., mortar) or machine-assisted method 50 such as using a mechanical blender, or any other apparatus known to those of ordinary skill in the art. Grinding provides efficient and consistent particle size reduction. In a preferred embodiment, the first solid is ground using a mortar pestle into a powder.

At step 58, the method 50 may include calcining the first powder at a temperature in a range of from 600 to 800° C. for a time in a range of from 2 to 4 hours (h) to obtain a second solid. The calcination of the precipitate is carried out by heating it to a high temperature, under a restricted supply of ambient oxygen. This is performed to remove impurities or volatile substances and to incur thermal decomposition. Typically, the calcination is carried out in a furnace preferably equipped with a temperature control system, which may provide a heating rate of up to 50° C. per minute (° C./min), preferably up to 40° C./min, preferably up to 30° C./min, preferably up to 20° C./min, preferably up to 10° C./min, preferably up to 5° C./min, preferably up to 2° C./min, and preferably up to 1° C./min.

The powder is calcined at a range of from 600 to 800° C., preferably 610 to 790° C., preferably 620 to 780° C., preferably 630 to 770° C., preferably 640 to 760° C., preferably 650 to 750° C., preferably 660 to 740° C., preferably 670 to 730° C., preferably 680 to 720° C., and preferably 690 to 710° C. for a time in a range of from 2 to 4 h, preferably 2.5 to 3.5 h, and preferably 2.75 to 3.25 h, to obtain a second solid. The powder is calcined at a range of from 675 to 725° C., preferably 680 to 720° C., preferably 685 to 715° C., preferably 690 to 710° C., preferably 695 to 705° C. for a time in a range of from 2.75 to 3.25 h, preferably 2.8 to 3.2 h, and preferably 2.9 to 3.1 h. In a preferred embodiment, the powder is calcined at 700° C. for 3 h.

At step 60, the method 50 may include grinding the second solid and urea, in an amount sufficient to form the nanocomposite, into a second powder. In alternate embodiments, nitrogen-containing precursors may include, but not limited to, melamine, dicyandiamide, ammonium thiocyanate, or ammonium carbonate. These alternatives provide nitrogen necessary for the formation of carbon nitride structures. Typically, these precursors are used in amounts of approximately 5 wt. % relative to the total weight of the nanocomposite to achieve desired nitrogen content for the desired structural properties.

At step 62, the method 50 may include heating the second powder at a temperature in a range of from 550 to 650° C. for a time in a range of from 15 min (0.25 h) to 1.5 h to obtain the nanocomposite, including graphitic $C_3N_4$, $V_2O_5$, and $MgAl_2O_4$ in a mass relationship to each other in a range of from 5 to 15:2 to 7:75 to 95, while tolerable variations of any of these values may be ±2.5, 2, 1.5, 1, 0.75, 0.5, 0.25, 0.1, 0.5, or 0.1. The heating temperature ranges from 550 to 650° C., preferably 560 to 640° C., preferably 570 to 630° C., preferably 580 to 620° C., preferably 590 to 610° C., and yet more preferably 600° C. for a time in a range of from 15 min (0.25 h) to 1.5 h, preferably 0.3 h to 1.4 h, preferably 0.4 h to 1.3 h, preferably 0.5 h to 1.2 h, preferably 0.6 h to 1.1 h, preferably 0.7 h to 1.0 h, and preferably 0.8 h to 0.9 h to obtain the nanocomposite, including graphitic $C_3N_4$, $V_2O_5$, and $MgAl_2O_4$ in a mass relationship to each other in a range of from 5 to 15:2 to 7:75 to 95, preferably 7 to 13:3 to 6:80 to 90, and preferably 9 to 11:4 to 5:84 to 86. The heating of the second powder is at a temperature in a range of from 590-610° C., preferably 592 to 608° C., preferably 594 to 606° C., preferably 596 to 604° C., and preferably 598 to 602° C. for a time in a range of from 55 min to 1.1 h, and preferably 1 h. In a preferred embodiment, the method may include heating the second powder at 600° C. for 1 h to obtain the nanocomposite, including graphitic $C_3N_4$, $V_2O_5$, and $MgAl_2O_4$ in a mass relationship of 10:5:85. The second powder may be heated by using heating appliances such as hot plates, furnace, heating mantles ovens, microwaves, autoclaves, tapes, oil baths, salt baths, sand baths, air baths, hot-tube furnaces, and hot-air guns. In a preferred embodiment, the second powder is heated in a furnace in a crucible.

EXAMPLES

The following examples demonstrate a method of manufacturing a nanocomposite including graphitic-$C_3N_4$ and a metavanadate salt. The examples are provided solely for illustration and are not to be construed as limitations of the present disclosure, as many variations thereof are possible without departing from the spirit and scope of the present disclosure.

Example 1: Fabrication of g-$C_3N_4$@$V_2O_5$/$MgAl_2O_4$ (10:5:85, Wt. %) Nanocomposite According to the present disclosure, magnesium nitrate, and aluminum nitrate were added together in one beaker with ammonium metavanadate, in a predetermined amount (here, stoichiometric), to produce a 10% $V_2O_5$@$MgAl_2O_4$ nanocomposite. Further, about 10 grams (g) of methanol, as a fuel, was added to the beaker, followed by 30 milliliters (mL) of distilled water. The beaker was heated till a clear solution was obtained, and heated further till dryness. The obtained product was ground in a mortar, transferred to a 150 mL porcelain dish, and calcined at 700° C. for 3.0 hours. Furthermore, the 10% $V_2O_5$@$MgAl_2O_4$ product was cooled down to room temperature and weighed, ground with urea in an amount suitable (here, 2 g urea to 20 g of the 10% $V_2O_5$/$MgAl_2O_4$ product, but depending upon the reaction conditions, this may be 5, 10, 15, 20, 25, 33, 50, 100, 150, 250, 500, or 1000 parts by weight of urea to 100 parts by weight of 10% $V_2O_5$/$MgAl_2O_4$, and optionally no more than 100,000, 50,000, 25,000, 10,000, 5,000, 1,000, 750, 500, 400, 333, 250, 125, 100, 75, 50, 25, 20, 15, or 10 parts by weight urea to 100 parts) to produce g-$C_3N_4$@$V_2O_5$/$MgAl_2O_4$ (10% g-$C_3N_4$) @90% ($V_2O_5$/$MgAl_2O_4$) nanocomposite. The quadruple mixture was returned and heated to 600° C. for 60 minutes in a covered porcelain crucible, and subsequently, the g-$C_3N_4$@ $V_2O_5$/$MgAl_2O_4$ (10:5:85, wt. %) nanocomposite was collected.

Example 2: Characterization

X-ray diffraction (XRD) was used to identify the crystalline states in each specimen, employing the JDX-8030 X-ray, JEOL, made in Japan. Cu-filtered Cu-Kα radiation (1.5418 Å) powered at 45 kV and 10 mA was used to run the patterns. The specimens were tested at ambient temperatures in a range of 2θ=5° to 80°. The surface morphologies of the obtained samples were analyzed using images of transmission electron microscopy (TEM), selected area electron diffraction (SAED), and high-resolution transmission electron microscopy (HRTEM), obtained by a Tecnai-G20 (USA) transmission electron microscope with a 200 kV speed voltage. $N_2$ adsorption isotherm obtained at 77 K using Micrometrics ASAP 2020 Brünauer-Emmett-Teller analyzer was used to calculate the surface characteristics, specifically the BET surface area, total pore volume (Vp), and mean pore radius (r). Before beginning the measurement, the samples were outgassed for three hours at 200° C. with a decreased pressure of 10-5 Torr.

Results

Figure 2:
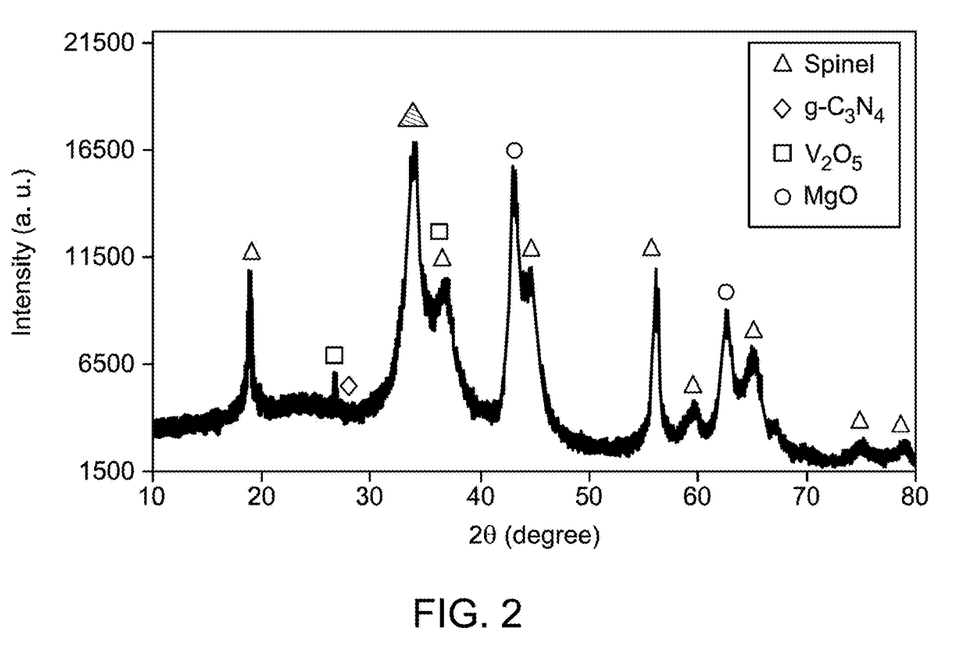
FIG. 2 is a graph depicting X-ray diffraction (XRD) patterns of an inventive 10% g-$C_3N_4$@$V_2O_5$/$MgAl_2O_4$ nanocomposite.

As mentioned above, XRD was used to examine the crystallinity and phase identification of the g-$C_3N_4$@$V_2O_5$/$MgAl_2O_4$ catalyst, the results are depicted in FIG. 2. The high crystalline nature of the nanocomposite was indicated by sharp peaks and high-intensity values, as shown in FIG. 2. Furthermore, the broad peak shows the small size of particles of the produced nanocomposite. The phases $V_2O_5$, MgO, $MgAl_2O_4$, and g-$C_3N_4$ were identified by analyzing the diffraction patterns with the standard COD cards. The $MgAl_2O_4$ spinel phase was successfully identified by diffraction that was present at the 2θ values of 18.6°, 44.9°, 56.1°, 59.7°, and 74.7° (COD No. 9002136). The corresponding designs for the diffractions were (111), (400), (422), (511), and (620), respectively. The cubic phase of MgO was found at 2θ values of 37.0°, 62.6°, 75.7°, and 79.07° (PDF card, No. 1011118). The above mentioned diffractions originated from planes (111), (220), (311), and (222), respectively. It has also been previously observed that MgO is present along with the $MgAl_2O_4$ spinel phase. In addition, the peak at 34.1° related to $Al_2O_3V_2O_5$ was represented by diffractions at 2θ values of 26.6°, 34.0°, 43.1°, and 64.9° (COD No. 00-4124511). The emergence of weak $V_2O_5$ diffraction suggests that the $V_2O_5$ has completely dissolved within the spinel and g-$C_3N_4$ lattices. Graphitic-$C_3N_4$-related diffractions were detected at 67.2° and 79.0° (COD No. 1534042).

Figure 3A:
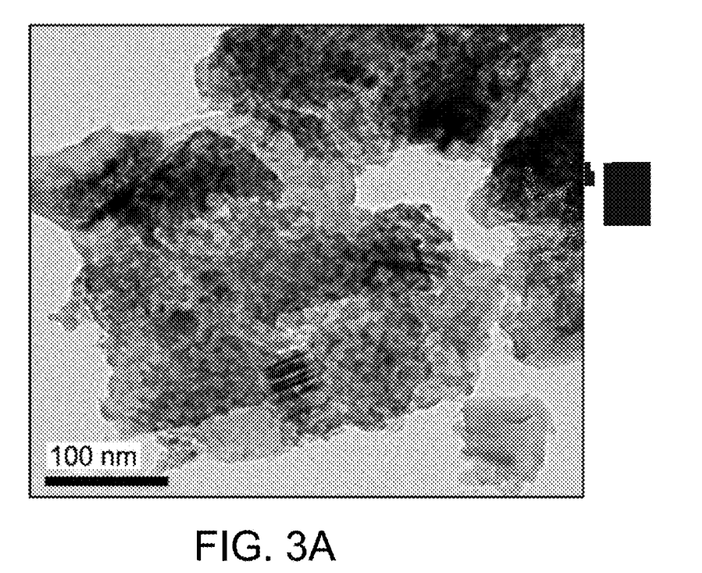
FIG. 3A is a transmission electron microscopy (TEM) image of an inventive 10% g-$C_3N_4$@$V_2O_5$/$MgAl_2O_4$ nanocomposite, at 100 nanometers (nm) magnification.
Figure 3B:
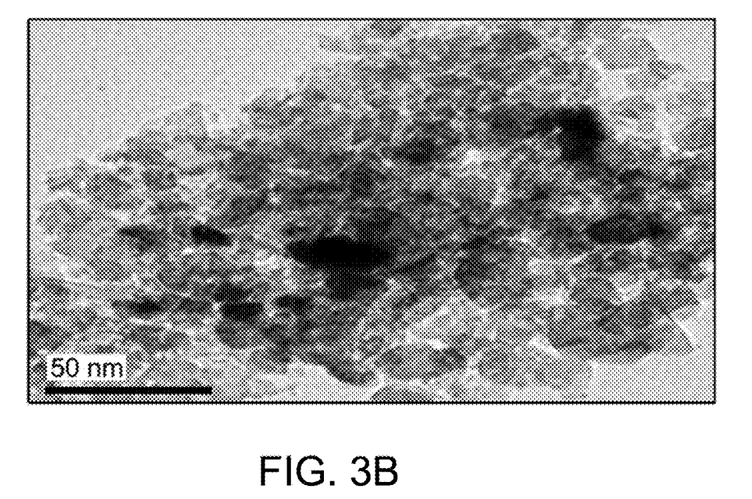
FIG. 3B is another TEM image image of an inventive 10% g-$C_3N_4$@$V_2O_5$/$MgAl_2O_4$ nanocomposite, at 50 nm magnification.
Figure 3C:
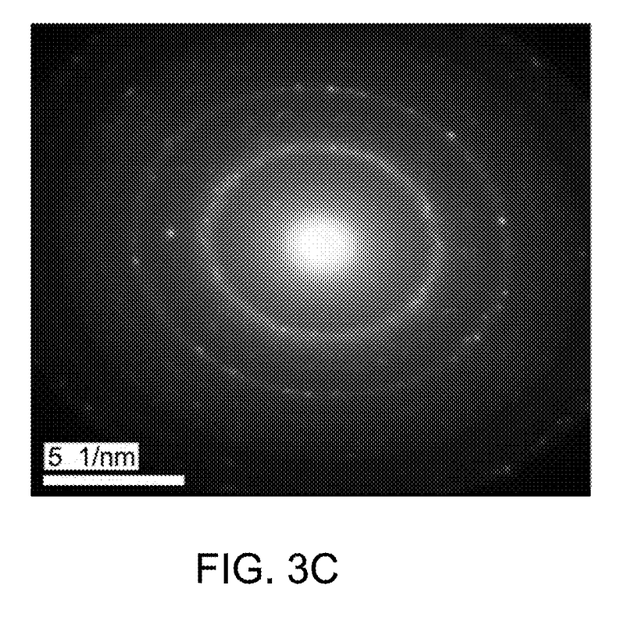
FIG. 3C is a selected area electron diffraction (SAED) pattern of an inventive 10 g-$C_3N_4$@$V_2O_5$/$MgAl_2O_4$ nanocomposite.
Figure 3D:
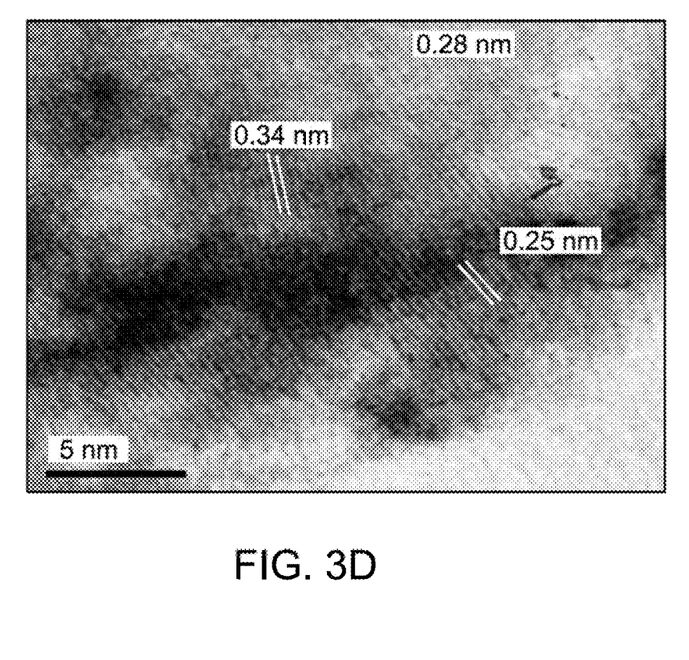
FIG. 3D is a high-resolution transmission electron microscopy (HRTEM) image of an inventive 10% g-$C_3N_4$@$V_2O_5$/$MgAl_2O_4$ nanocomposite.
Figure 3E:
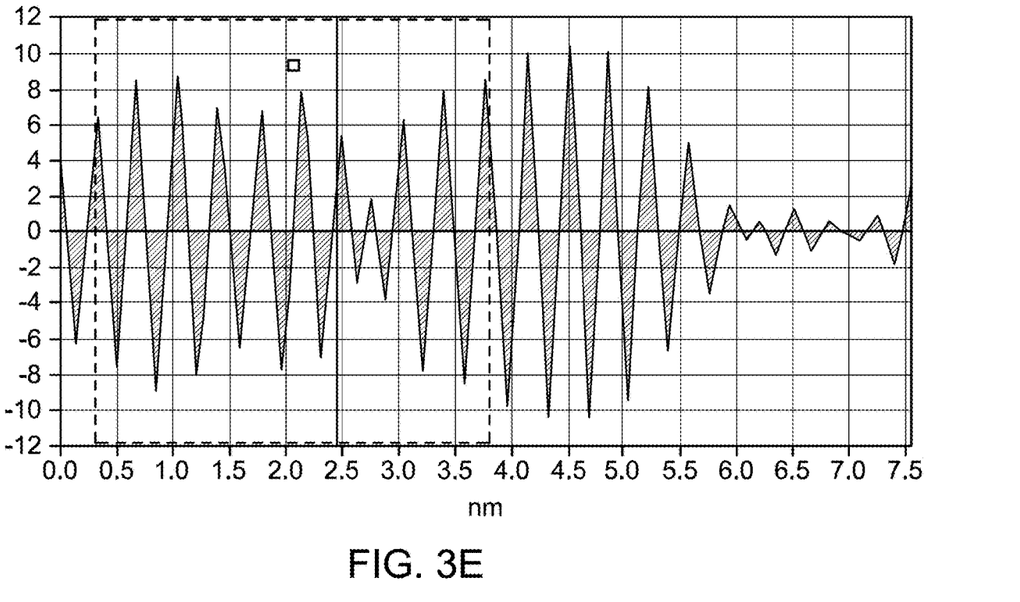
FIG. 3E is a fast Fourier transform (FFT) spectra of an inventive 10% g-$C_3N_4$@$V_2O_5$/$MgAl_2O_4$ nanocomposite.
Figure 3F:
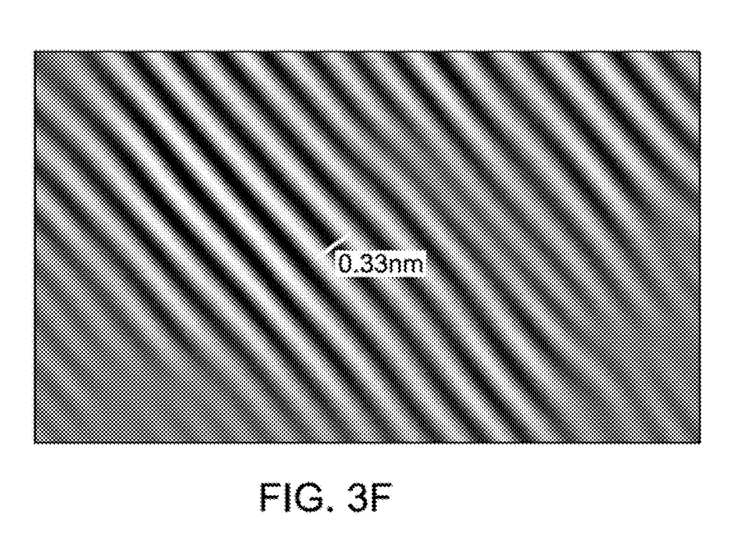
FIG. 3F is an inverse fast Fourier transform (IFFT) spectra of an inventive 10% g-$C_3N_4$@$V_2O_5$/$MgAl_2O_4$ nanocomposite.

Further, TEM images of g-$C_3N_4$@$V_2O_5$/$MgAl_2O_4$ nanocomposite are shown in FIGS. 3A and 3B. The TEM images show the well dispersion of homogeneous spherical metal oxides nanoparticles with a size of about 9.4 nm on two-dimensional porous structure constructed with curled and wrinkled nanosheets and platelets of the g-$C_3N_4$. The corresponding SAED pattern, shown in FIG. 3C, and HRTEM image in FIG. 3D, reveal diffraction spots with interplanar spacing of 0.260 nm, 0.183 nm, 0.147 nm, and 0.129 nm, due to (111, $V_2O_5$), (400, spinel), (220, MgO), and (620, spinel) diffraction planes, respectively. The corresponding HRTEM of the nanocomposite, depicted in FIG. 3D, shows a plane spacing of 0.34 nm related to the (002) of CN, where 0.28 nm relates to (220) plane of spinel and 0.262 nm relates to (111) plane of $V_2O_5$, respectively, characterizing the heterostructure formation. The fast Fourier transform (FFT) and inverse fast Fourier transform (IFFT) measurements, as depicted in FIG. 3E and FIG. 3F, show a 'd' value of about 0.33 nm given to g-$C_3N_4$@$V_2O_5$/$MgAl_2O_4$ nanocomposite, signifying the lattice spacing of (002), indicating the development of g-$C_3N_4$ structure.

Figure 4A:
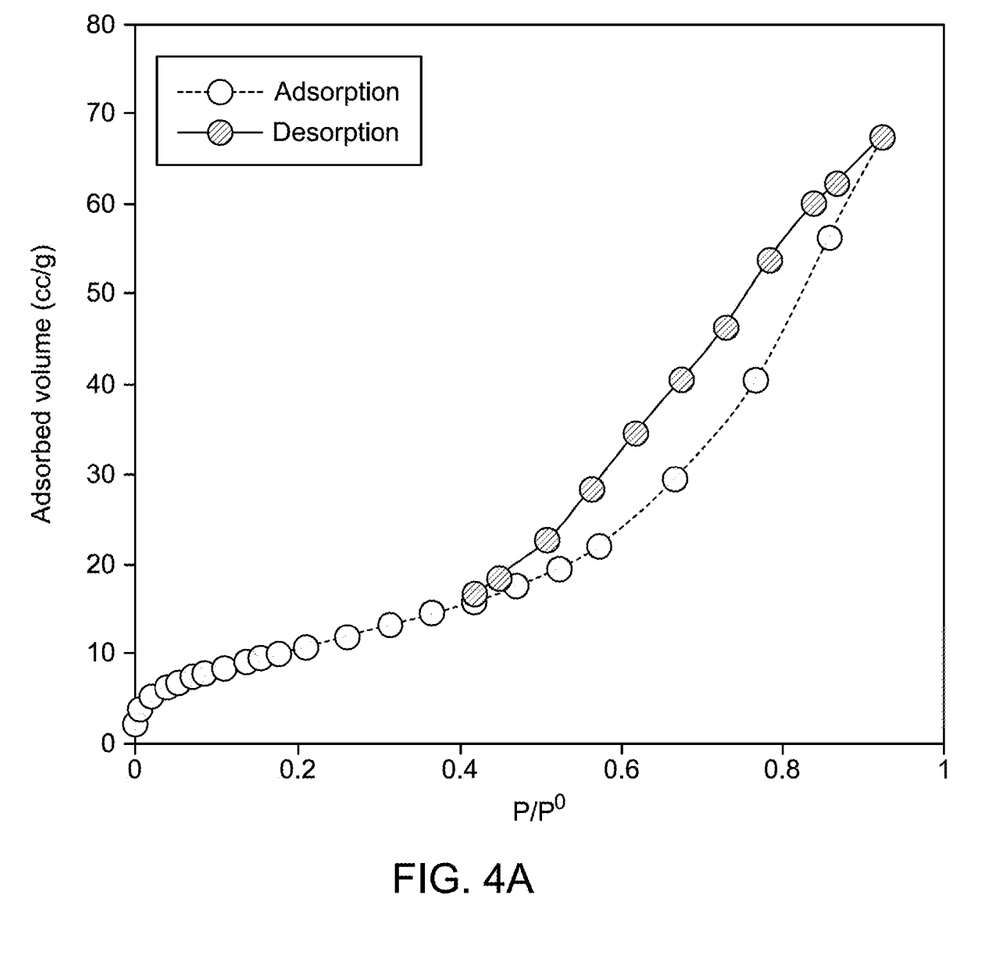
FIG. 4A is a graph depicting nitrogen adsorption-desorption isotherm of an inventive g-$C_3N_4$@$V_2O_5$/$MgAl_2O_4$ nanocomposite.
Figure 4B:
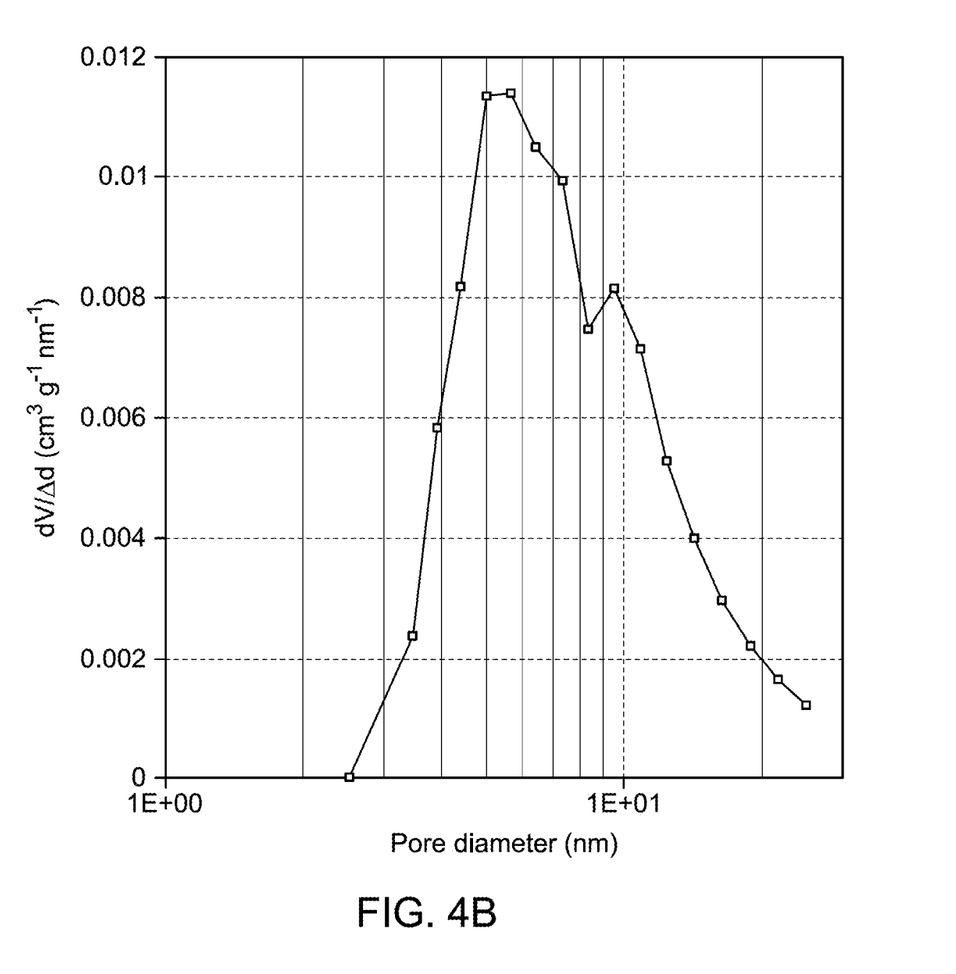
FIG. 4B is a graph depicting the pore size distribution of an inventive g-$C_3N_4$@$V_2O_5$/$MgAl_2O_4$ nanocomposite.

FIGS. 4A and 4B display the nitrogen adsorption-desorption isotherms of $V_2O_5$/$MgAl_2O_4$/g-$C_3N_4$ nanocomposite and a corresponding pore size distribution of the nanocomposite. The nitrogen sorption isotherm of the composite relates to type IV with clear hysteresis loop, indicating the formation of mesoporous structures. However, shifting the loop to a relatively lower pressure (P/P°=0.42 to 1) suggests a decrease in the size of the mesopores, which may result from the deposition of metal oxides particles in the wide pores of g-C$_3$N$_4$. Furthermore, the BET surface area of the V$_2$O$_5$/MgAl$_2$O$_4$/g-C$_3$N$_4$ sample was calculated to be 43.3 m$^2$/g. The marked high specific surface area reflects the good dispersion of these metal oxides nanoparticles on g-C$_3$N$_4$. Moreover, the pore size distribution curves, plotted using the BJH method, for the V$_2$O$_5$/MgAl$_2$O$_4$/g-C$_3$N$_4$ sample exhibited unimodal distribution with average pore diameter maximized at 5.66 nm and pore volume of 0.105 cm$^3$/g. The isotherm belongs to the category H3 type of pores, which do not exhibit limiting adsorption at high P/P°, and arise due to aggregation of plate-like particles giving rise to slit-shaped pores. This indicates that the assembly of V$_2$O$_5$/MgAl$_2$O$_4$/g-C$_3$N$_4$ composite provided a mesoporous array.

The aspects of the present disclosure provide the method of manufacturing the nanocomposite, in particular, the g-C$_3$N$_4$@V$_2$O$_5$/MgAl$_2$O$_4$ (10:5:85, wt. %) nanocomposite, synthesized through a facile and scalable approach. The disclosed method provides desirable dispersion, improved interfacial interactions, and superior physicochemical properties, making it suitable for various nanotechnology applications. The method as disclosed herein provides a nanocomposite with specific composition which may provide improved stability, catalytic performance, and functional versatility, offering advantages over conventional nanocomposite fabrication techniques.

Numerous modifications and variations of the present disclosure are possible in light of the above teachings. It is therefore to be understood that within the scope of the appended claims, the invention may be practiced otherwise than as specifically described herein.

The invention claimed is:

1. A method of manufacturing a nanocomposite, the method comprising:
combining a magnesium salt, aluminum salt, and a metavanadate salt in stoichiometric proportions within 5 mol. % in an aqueous solvent comprising menthol or dextrose, to obtain a first mixture;
heating the first mixture to remove at least 99.5 wt. % of the aqueous solvent to obtain a first solid;
grinding the first solid into a first powder;
calcining the first powder at a temperature in a range of from 600 to 800° C. for a time in a range of from 2 to 4 hours to obtain a second solid;
grinding the second solid and urea, in a ratio of 2 to 100 parts by weight of the urea per 1 part of the second solid to form the nanocomposite, into a second powder;
heating the second powder at a temperature in a range of from 550 to 650° C. for a time in a range of from 15 minutes to 1.5 hours to obtain the nanocomposite, comprising graphitic C$_3$N$_4$, V$_2$O$_5$, and MgAl$_2$O$_4$ in a mass relationship in a range of from 5 to 15:2 to 7:75 to 95.

2. The method of claim 1, wherein the average pore distribution of the nanocomposite is unimodal, and
wherein a BET specific surface area of the nanocomposite is in a range of from 25 to 75 m$^2$/g, and/or
wherein an average pore diameter of the nanocomposite, according to BJH measurement method, is in a range of from 1 to 10 nm, and/or
wherein an average pore volume of the nanocomposite, according to the BJH measurement method, is in a range of from 0.01 to 0.5 cm$^3$/g.

3. The method of claim 1, wherein the nanocomposite has a (111) interplanar spacing in a range of from 0.220 to 0.300 nm, a (400) spinel interplanar spacing in a range of from 0.140 to 0.220 nm, a (220) interplanar spacing in a range of from 0.105 to 0.195 nm, and a (620) spinel interplanar spacing in a range of from 0.090 to 0.170, according to selected area diffraction.

4. The method of claim 1, wherein the mass relationship of the nanocomposite is in a range of from 9 to 11:4 to 6:84 to 86,
wherein the nanocomposite has a (111) interplanar spacing of 0.260±2% nm, a (400) spinel interplanar spacing of 0.183±2% nm, a (220) interplanar spacing of 0.147±2% nm, and a (620) spinel interplanar spacing of 0.129±2% nm, according to selected area diffraction,
wherein an XRD spectrum of the nanocomposite under Cu-filtered Cu-Ka radiation (1.5418 Å) powered at 45 kV and 10 mA has 20 peaks of
an MgAl$_2$O$_4$ spinel phase at 18.6±1, 44.9±1, 56.1±1, 59.7±1, and 74.7±1°,
an MgO cubic phase at 37.0±1, 62.6±1, 75.7±1, and 79.07±1°,
an Al$_2$O$_3$V$_2$O$_5$ phase at 26.6±1, 34.0±1, 43.1±1, and 64.9±1°, and
g-C$_3$N$_4$-related diffractions at 67.2±1 and 79.0±1°, and
wherein the V$_2$O$_5$ is at least 95% dissolved within the MgAl$_2$O$_4$ spinel phase and g-C$_3$N$_4$ lattice, as detected in the XRD spectrum.

5. The method of claim 1, wherein the magnesium salt in the combining comprises Mg(NO$_3$)$_2$,
wherein the aluminum salt in the combining comprises Al(NO$_3$)$_3$,
wherein the metavanadate salt in the combining comprises NH$_4$VO$_3$,
wherein the heating of the first mixture obtains the first solid with at least 99.9 wt. % of the aqueous solvent removed,
wherein the calcining is at a temperature in a range of from 675 to 725° C. for a time in a range of from 2.75 to 3.25 hours, and
wherein the heating of the second powder is at a temperature in a range of from 590 to 610° C. for a time in a range of from 55 minutes to 1.1 hours.

6. The method of claim 1, wherein the nanocomposite comprises no more than 10 wt. % of TiO$_2$, relative to a total metal oxide weight.

7. The method of claim 1, wherein the nanocomposite comprises no more than 1 wt. % of AlN, relative to a total metal oxide weight.

8. The method of claim 1, wherein the nanocomposite comprises no more than 1 wt. % SiO$_2$, relative to a total metal oxide weight.

9. The method of claim 1, wherein carbon materials in the nanocomposite comprise no more than 1 wt. % carbon nanotubes, relative to total nanocomposite weight.

10. The method of claim 1, wherein the nanocomposite comprises no more than 1 wt. % AgBr, relative to a total metal oxide weight.

11. The method of claim 1, wherein the nanocomposite comprises no more than 1 wt. % Co, relative to total nanocomposite weight.

12. The method of claim 1, wherein the nanocomposite comprises no more than 1 wt. % elemental state metal, relative to total nanocomposite weight.

13. The method of claim 1, wherein the nanocomposite comprises no more than 1 wt. %, individually, elemental state Co and Fe, relative to total nanocomposite weight.

14. The method of claim 1, which does not comprise sonicating any starting materials in a range of from 1 to 100 KHz.

15. The method of claim 1, wherein the nanocomposite comprises no more than 10 wt. % MgO, relative to a total metal oxide weight.

16. The method of claim 1, wherein the nanocomposite obtained comprises no more than 1 wt. % carbonaceous material besides the graphitic carbon nitride, and wherein carbon materials in the nanocomposite comprise no nanotubes, relative to total nanocomposite weight.

17. The method of claim 1, wherein the nanocomposite comprises no more than 10 wt. % $VO_4$, relative to total vanadium-oxide weight, and
wherein the nanocomposite comprises no more than 1 wt. % V-doped ZnO, relative to total nanocomposite weight.

18. The method of claim 1, wherein, relative to a total metal oxide weight, the nanocomposite comprises no more than 1 wt. %, individually, of $Al_2O_3$, ZnO, $Fe_3O_4$, $CeFeO_3$, $GdFeO_3$, $LaFeO_3$, $BaTiO_3$, $CaTiO_3$, $SrTiO_3$, $CaZrO_3$, $PbTiO_3$, $Mg_{1-x}Ni_xFe_2O_4$ (x=0.0, 0.6, 1.0), Ag, $CoFe_2O_4$, $CuFe_2O_4$, $MnFe_2O_4$, $NiFe_2O_4$, $ZnFe_2O_4$, $Cu_{1-x}Cd_xFe_2O_4$, $Zn_{0.7}Ni_{0.15}Cu_{0.15}Fe_2O_4$, $Zn_{0.3}Ni_{0.7-x}Co_xFe_2O_4$ ($0 \leq x \leq 0.7$), $Mn_{0.1}Mg_{0.2}(Co, Ni, Zn)_{0.7}Fe_2O_4$, $LaCo_{0.5}Fe_{0.5}O_3$, $Mg_{0.1}$—$Co_{0.9}Fe_2O_4$, $La_{1-x}Gd_xCr_{1-y}Ni_yO_3$, $Gd_2FeCrO_6$, $KTaO_3$, $NaTaO_3$, $NaNbO_3$, $KNbO_3$, $Mg_{1-x}Ni_xFe_2O_4$, $Cu_{0.5}Cd_{0.25}Co_{0.25}Fe_{2-x}O_4$, $Zn_{0.5}CO_{0.5}La_xFe_{2-x}O_4$, $Pr_2Ti_2O_7$, $SiO_2$, $TiO_2$, ZnO, ZnS, $Bi_4O_5I_2$, $SrFe_{0.5}Ta_{0.5}O_3$, $La_{0.8}Ba_{0.2}TiO_{3.5-\delta}$, $LaTiO_{3.5-\delta}$, $NaNbO_3$, and $LaFeO_3$.

19. The method of claim 1, wherein the graphitic $C_3N_4$ in the nanocomposite consists essentially of sheet morphologies, and/or
wherein the graphitic $C_3N_4$ in the nanocomposite comprises no more than inevitable traces of boron.

20. The method of claim 1, wherein the nanocomposite comprises no more than 10 wt. %, individually, relative to total metal content, of any of Zn, Ce, Gd, La, Ba, Ti, Ca, Sr, Zr, Pb, Ni, Ag, Co, Cu, Mn, Cd, Ta, Nb, Pr, and Bi, and
wherein the nanocomposite comprises no more than 1 wt. %, individually, relative to total carrier weight, of $SiO_2$, $TiO_2$, ZnO, and ZnS.

* * * * *